(12) United States Patent
Hildenbrand et al.

(10) Patent No.: US 12,012,024 B2
(45) Date of Patent: Jun. 18, 2024

(54) SEAT WITH HEADREST FOR A LOCOMOTIVE MEANS AND LOCOMOTIVE MEANS

(71) Applicant: Bayerische Motoren Werke Aktiengesellschaft, Munich (DE)

(72) Inventors: Jens Hildenbrand, Unterfoehring (DE); Rolf Lechner, Munich (DE); Robert Lenz, Moosthenning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 27 days.

(21) Appl. No.: 17/597,271

(22) PCT Filed: Jul. 1, 2020

(86) PCT No.: PCT/EP2020/068554
§ 371 (c)(1),
(2) Date: Dec. 30, 2021

(87) PCT Pub. No.: WO2021/001438
PCT Pub. Date: Jan. 7, 2021

(65) Prior Publication Data
US 2022/0314856 A1 Oct. 6, 2022

(30) Foreign Application Priority Data
Jul. 3, 2019 (DE) ............... 10 2019 117 990.4

(51) Int. Cl.
*B60N 2/888* (2018.01)
*B60N 2/829* (2018.01)
(Continued)

(52) U.S. Cl.
CPC ............. *B60N 2/888* (2018.02); *B60N 2/829* (2018.02); *B60N 2/865* (2018.02); *B60N 2/894* (2018.02)

(58) Field of Classification Search
CPC ........ B60N 2/888; B60N 2/829; B60N 2/809; B60N 2/894; B60N 2/865
See application file for complete search history.

(56) References Cited

U.S. PATENT DOCUMENTS 4,466,663 A * 8/1984 Oishi .................... B60N 2/812
297/391
5,330,228 A * 7/1994 Krebs .................... B60R 22/02
297/483
(Continued)

FOREIGN PATENT DOCUMENTS

CN 108248471 A 7/2018
DE 196 02 909 A1 7/1997
(Continued)

OTHER PUBLICATIONS

International Search Report (PCT/ISA/210) issued in PCT Application No. PCT/EP2020/068554 dated Oct. 21, 2020 with English translation (six (6) pages).
German-language Written Opinion (PCT/ISA/237) issued in PCT Application No. PCT/EP2020/073587 dated Oct. 21, 2020 (six (6) pages).
(Continued)

*Primary Examiner* — Philip F Gabler
(74) *Attorney, Agent, or Firm* — Crowell & Moring LLP

(57) ABSTRACT

A seat with a headrest for a locomotive means includes a carrier or support system for a backrest of the seat, a support element having an installation section, and a guide device. The headrest has a headrest box, wherein the installation section of the support element is arranged on the support system in a stationary manner in the region of the headrest. The headrest box is movably arranged on the guide device, and the headrest box can be locked relative to the guide device in a movement direction.

9 Claims, 2 Drawing Sheets

(51) Int. Cl.
    *B60N 2/865*     (2018.01)
    *B60N 2/894*     (2018.01)

(56) References Cited

U.S. PATENT DOCUMENTS

| | | | | |
|---|---|---|---|---|
| 7,543,888 | B2* | 6/2009 | Kuno | B60N 2/0252 |
| | | | | 297/391 |
| 8,459,745 | B2* | 6/2013 | Wahlers | B60N 2/806 |
| | | | | 297/410 |
| 8,573,702 | B2* | 11/2013 | Tscherbner | B60N 2/821 |
| | | | | 297/410 |
| 9,718,381 | B2* | 8/2017 | Yoo | B60N 2/806 |
| 10,414,312 | B2* | 9/2019 | Fredriksson | B60N 2/829 |
| 10,953,989 | B1* | 3/2021 | Mansouri | B60N 2/809 |
| 2009/0096468 | A1* | 4/2009 | Hirota | B60N 2/0276 |
| | | | | 297/391 |
| 2012/0080924 | A1 | 4/2012 | Steinmetz | |
| 2018/0178696 | A1* | 6/2018 | Dexter | B60N 2/829 |
| 2019/0160985 | A1 | 5/2019 | Yu et al. | |
| 2019/0225123 | A1 | 7/2019 | Karthaus | |
| 2019/0241107 | A1 | 8/2019 | Jeong | |
| 2020/0262316 | A1 | 8/2020 | Gumprecht et al. | |

FOREIGN PATENT DOCUMENTS

| | | |
|---|---|---|
| DE | 100 58 518 A1 | 6/2002 |
| DE | 10 2010 038 250 A1 | 4/2012 |
| DE | 10 2011 010 232 A1 | 8/2012 |
| DE | 10 2011 011 515 A1 | 8/2012 |
| DE | 10 2012 022 235 A1 | 3/2014 |
| DE | 10 2017 204 562 A1 | 9/2017 |
| DE | 10 2016 219 012 A1 | 4/2018 |
| DE | 10 2017 120 939 A1 | 3/2019 |
| DE | 11 2017 005 184 T5 | 7/2019 |
| EP | 0 967 115 A2 | 12/1999 |
| EP | 1 449 713 A2 | 8/2004 |
| EP | 2 698 277 A1 | 2/2014 |

OTHER PUBLICATIONS

German-language Search Report issued in German Application No. 10 2019 117 990.4 dated Dec. 2, 2019 with a partial English translation (13 pages).

English translation of Chinese-language Office Action issued in Chinese Application No. 202080046948.4 dated Apr. 14, 2023 with English translation (8 pages).

* cited by examiner

SEAT WITH HEADREST FOR A LOCOMOTIVE MEANS AND LOCOMOTIVE MEANS

BACKGROUND AND SUMMARY OF THE INVENTION

The present invention relates to a seat with a headrest for a locomotive means, and to a locomotive means.

Seats for locomotive means that can be adapted to different heights and/or preferences of different users of the locomotive means by means of manually and/or automatically adjustable headrests are known from the prior art. According to a conventional design of these seats, a lower end of the headrests of the seats is in each case arranged on the backrests, by means of a plurality of carrier rods at an upper end of the respective backrests of the seats, in such a manner that the headrests are displaceable in a vertical direction along the plurality of carrier rods and are lockable in a desired position. On the basis of this conventional design, specific design requirements providing, inter alia, concealment of carrier rods of the headrests, cannot be implemented on seats for modern locomotive means.

Furthermore, what are referred to as crash-active headrests (CAK), are known which are configured to reduce a distance between the back of the head of a user and a headrest surface facing the back of the head of the user in the event of an accident by automatically displacing the headrest in the direction of the back of the head of the user. In this way, inter alia, a loading on the cervical spine of the user in the event of an accident can be significantly reduced. The automatic displacement can be undertaken, for example, pyrotechnically or on the basis of a spring mechanism.

Furthermore, what are referred to as sports seats or bucket seats are known from the prior art and are designed in such a manner that the backrests thereof and the headrests thereof are in each case a single part, that is to say that the headrests are an integral part of the backrests. This has the disadvantage that the headrests are not adjustable and, due to a restricted arrangement space and/or displacement space in the region of the headrest, do not permit any crash activity.

It is an object of the present invention to provide a seat with a headrest, the seat being configured to conceal a connecting region between a headrest and a backrest of the seat while the headrest continues to be adjustable.

The solution to the object identified above is achieved by the features of the independent claims. The dependent claims contain preferred developments of the invention.

According to a first aspect of the present invention, a seat with a headrest for a locomotive means is proposed. The locomotive means can be, for example, a road vehicle (for example a motorcycle, passenger car, truck) or a rail vehicle or an aeroplane/aircraft and/or a watercraft. For the purposes of a simplified description, the description below uses a system of coordinates of the locomotive means that is defined by a transverse axis of the locomotive means, also called y axis below, by a longitudinal axis of the locomotive means, also called x axis below (wherein a positive direction of the x axis corresponds to a main direction of travel of the locomotive means) and by a vertical axis of the locomotive means, also called z axis below. It should be pointed out in this connection that elements which are described below with respect to this system of coordinates (for example the seat according to the invention) are not restricted to a respectively described arrangement or orientation within the system of coordinates. The seat according to the invention is described by way of example below in a standard orientation of a seat of a locomotive means in the direction of the x axis of the locomotive means (i.e. facing in the direction of travel). This is intended explicitly not to constitute any restriction in respect of a possibly differing arrangement or orientation of the seat. The seat can also be arranged, for example, in the direction of the y axis (in particular in the rear region) or diagonally in the direction of the x and the y axis, etc. Furthermore, the seat can also, for example, be mounted rotatably. It should also be pointed out that respective directional details with regard to the system of coordinates of the locomotive means does not have to be restricted precisely thereto but, unless mentioned differently, should be regarded as main direction details. A main direction of a backrest of the seat according to the invention is described below as lying in the direction of the z axis, although the backrest can generally additionally have a greater or lesser inclination in the negative direction of the x axis.

The seat can preferably be a driver's seat and/or a front passenger's seat of the locomotive means, with the configuration of the seat according to the invention also being able to be advantageously used for a rear seat or a plurality of rear seats and/or for a rear seat bench or a plurality of rear seat benches of the locomotive means. The seat according to the invention comprises a carrier system of the backrest, a carrier element comprising a mounting portion and a guide device, and the headrest which comprises a headrest box. The carrier system is a carrying structure of the backrest of the seat that is configured to absorb forces acting on the backrest and that is configured to be connected to a seat covering and/or seat padding. The carrier system can be assembled, for example, from a plurality of carrier rods which are connected in a form-fitting and/or force-fitting and/or integrally bonded manner and can have, inter alia, a round, an oval, a square, a triangular or some other cross section. Alternatively, or additionally, the carrier system or parts of the carrier system can have (complex) shaped parts which can be manufactured by casting, punching, drawing, pressing, etc. The carrier rods and/or the shaped parts can preferably be formed from metal (for example steel, aluminum, etc.). Alternatively or additionally, it is also conceivable to use metallic or non-metallic composite materials that are suitable for this purpose. The effect which can be achieved by means of the carrier system according to the invention of the backrest of the seat is in particular that a backrest structure which is known from the prior art and which generally extends in the prior art only as far as into a shoulder region of a user is extended in the direction of the z axis into the region of the headrest or beyond. The extension can be achieved by a form-fitting and/or force-fitting and/or integrally bonded extension of a backrest structure, known from the prior art, of the seat. Alternatively, the carrier system can be an integral part of a backrest structure that is correspondingly extended in the direction of the z axis. The carrier system of the seat according to the invention can have, for example, two carrier rods which run parallel in the direction of the z axis and, at the upper end of the backrest, form a common bracket. Furthermore, a portion of the carrier system lying below the headrest can be bent in a negative direction of the x axis in such a manner that an extended arrangement space and/or displacement space is available to the headrest (in particular in the direction of the z axis). In other words, an upper region of the carrier system can be displaced in a negative direction of the x axis parallel to a lower region of the carrier system.

Furthermore, the mounting portion of the carrier element is arranged in a fixed position on the carrier system in the region of the headrest. An arrangement position can lie in the direction of the z axis preferably in a region in which the headrest is provided on the backrest. The carrier element can be connected to the carrier system in a form-fitting and/or force-fitting and/or integrally bonded manner by means of the mounting portion. Furthermore, it is also conceivable for the carrier element to be formed as an integral part of the carrier system. The carrier element is preferably arranged on the carrier system by means of the mounting portion in such a manner that the carrier element is arranged on the carrier system substantially at an angle of 90° in the direction of the z axis. This constitutes an advantageous arrangement of the two components with respect to each other since the carrier element, which is a connecting element between the carrier system and the headrest, can be concealed or enclosed by this arrangement of the headrest. Furthermore, an angle between the two components can also be, for example, an angle between 70° and 90° or else an angle differing therefrom.

The headrest box of the headrest is a basic element of the headrest that is configured to be connected to a covering and/or to a padding for the headrest and that is configured to receive functional and non-functional components of the headrest (for example for crash activity). Furthermore, the headrest box is configured to be arranged displaceably on the guide device of the carrier element. An arrangement position of the headrest box on the guide device of the carrier element can lie outside the headrest box (i.e. between the headrest box and the carrier system) and/or within the headrest box. The headrest box can be arranged on the guide device, for example, via a receiving device which corresponds to the guide device and which can be arranged in a fixed position on the headrest box. The headrest box can be partially or completely open in a connecting region between the headrest box and the carrier element or the guide device on the side facing the carrier system.

The carrier element can preferably be designed in such a manner that the guide device is configured for guiding a movement oriented substantially parallel to a direction of longitudinal extent of the carrier system of the seat. The guide device and/or the receiving device can be designed, for example, in the form of a plurality of rails which engage in one another (for example two rails of the guide device and two rails of the receiving device) and which are configured to be displaced counter to one another in the longitudinal direction of the rails due to an action of force while the rails cannot be displaced with respect to one another in directions of actions of force differing therefrom. Alternatively, the guide device can also be assembled from one or more guide rods (with, for example, round, triangular, square cross sections, etc.) which are surrounded by one or more corresponding receptacles of the headrest box.

Furthermore, the seat according to the invention makes provision for the headrest box to be lockable with respect to the guide device in a displacement direction. It should be pointed out that basically one or more desired directions with respect to the system of coordinates of the locomotive means, i.e. in the direction of the y axis and/or of the x axis and/or of the z axis, is or are conceivable as the guide direction. A displacement in the direction of the z axis should be considered here to be a preferred guide direction or displacement direction of the headrest box, and therefore the focus of the description below, as representative of other possible displacement directions, is on the displacement in the direction of the z axis. The headrest can be locked on the guide device, for example, by a latching and/or clamping mechanism which can be released and/or closed manually and/or electrically. Alternatively or additionally, the headrest can also be locked on the guide device on the basis of self-locking of an electrically driven adjustment unit for the headrest.

In an advantageous refinement of the present invention, the seat furthermore comprises a rear wall which, with respect to the carrier system, lies opposite the headrest box. The rear wall can be fastened to the structure and/or to the carrier system of the backrest of the seat, for example, by means of a clamping and/or latching and/or screw connection. The rear wall can be formed, for example, from a plastic and/or a composite material and/or from other suitable materials, wherein an upper end of the rear wall extends at least as far as an upper end of the carrier system. In this manner, the backrest according to the invention which is extended in the direction of the z axis can be substantially covered by means of the rear wall from a lower end of the backrest as far as an upper end of the backrest, and therefore the carrier system can be concealed toward the interior of the locomotive means. The substantial covering does not exclude the rear wall being able to be assembled from a plurality of individual portions which are adjacent to one another and can be required, for example, for a buckling or bending function of the backrest.

Furthermore, the rear wall can be fastened along the structure of the backrest or along the carrier system by means of one or a plurality of additional fastening points (for example by means of clamping and/or screw and/or latching connections). By means of these additional fastenings and/or owing to a suitable structural configuration of the rear wall (for example folds and/or struts and/or honeycomb structures, etc.) and/or owing to a material selected for the rear wall and/or a combination of material selected for the rear wall, the rear wall itself can be designed as a (self-)carrying element which, in combination with the carrying function of the structure of the backrest or of the carrier system, can produce additional stability for the backrest. Furthermore, by means of a suitable configuration of the rear wall, a side of the headrest facing the carrier system and/or a lateral part of the headrest can be substantially covered.

In a further refinement of the present invention, the headrest of the seat furthermore comprises an actuator which can preferably be an electric motor (for example a rotating motor or linear motor) and a transmission, which can be, for example, a helical transmission, a toothed transmission, a rack and pinion transmission, etc. An immovable part of the transmission can be connected in a fixed position to the carrier element within the headrest box or can be an integral part of the carrier element while the actuator is in engagement with the transmission and is configured to move the headrest box with respect to the carrier element in the displacement direction. Using the example of a helical transmission, a threaded rod of the helical transmission can be connected in a fixed position to the carrier element while the actuator moves the headrest box, which is connected in a fixed position to the actuator, along the stationary threaded rod. Alternatively, the immovable part of the transmission can be an internal thread which is provided in the carrier element and by means of which a threaded rod which is connected in a fixed position to the actuator is moved in the longitudinal direction of the thread during a rotational movement of the threaded rod produced by the actuator. Abovementioned and moreover further known variants of transmissions can be used instead of the helical transmission in a manner obvious to a person skilled in the art. In this connection, it should be pointed out that the transmission can be arranged at different positions on the carrier element (in particular in the direction of the z axis of the carrier element). A cable routing for supplying current and activating the electric motor can preferably take place along the carrier system and the carrier element.

In a further advantageous refinement of the present invention, the guide device comprises two guide rails which are each arranged on the left and the right side of the transmission in the direction of the y axis and are configured in particular to absorb the forces, which act on the headrest box, in the direction of the x axis and the y axis. This does not require the guide rails and the transmission to have to lie in one plane in the direction of the x axis.

Furthermore, the headrest can be a crash-active headrest which has a release unit which is automatically displaceable in the direction of the x axis with respect to the headrest. In this connection, use can be made in particular of devices known from the prior art for implementing the crash activity. A cable routing for supplying current and/or activation for a headrest crash activity module realizing the crash activity can preferably take place analogously to the cable routing for the electric motor along the carrier system and the carrier element. The displaceability of the release unit in the direction of the x axis can furthermore also be used in order to adjust a basic distance desired by a user of the locomotive means between the headrest and the back of the head of the user. Alternatively or additionally to the crash activity, this can take place by an existing manual and/or electric adjustment unit which can be arranged within the headrest box.

According to a second aspect of the present invention, a locomotive means is proposed which comprises a seat according to the invention with a headrest according to the inventive aspect mentioned first. The features, combinations of features and the advantages resulting therefrom correspond to those explained in conjunction with the invention aspect mentioned first in such a manner that it is apparent that reference is made to the above explanations in order to avoid repetitions.

Further details, features and advantages of the invention emerge from the description below and the figures.

BRIEF DESCRIPTION OF THE DRAWINGS

Figure 1:
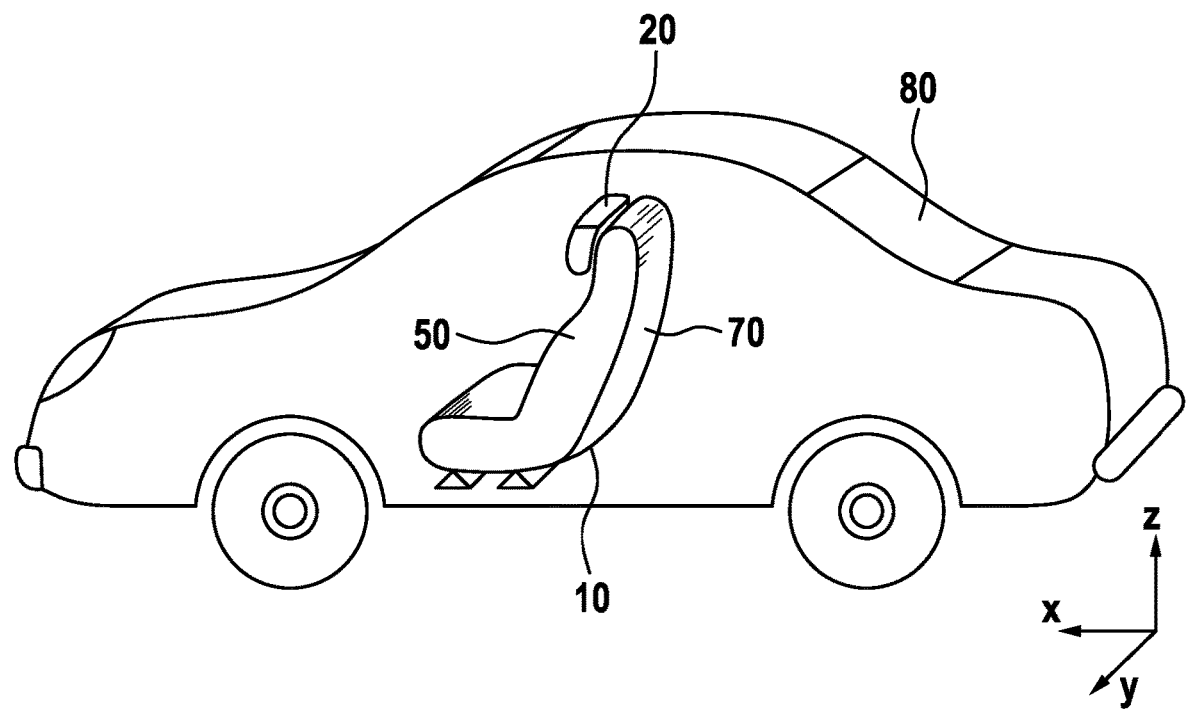
FIG. 1 shows a schematic overview of a seat according to an embodiment of the invention in conjunction with a locomotive means.

FIG. 1 shows a schematic overview of a seat 10 with a headrest 20 in conjunction with a locomotive means 80. The seat 10 is designed here as a driver's seat of the locomotive means 80. The seat 10 has a backrest 50, a headrest 20 and a rear wall 70.

Figure 2:
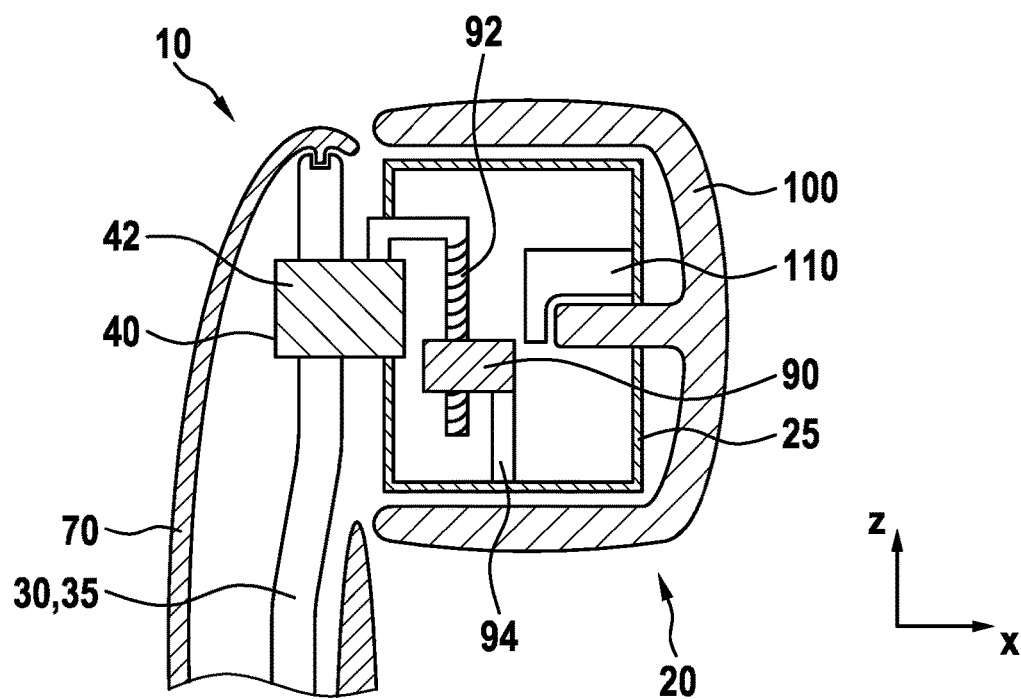
FIG. 2 shows a schematic overview of components of a seat according to an embodiment of the invention with a headrest in a first cross-sectional view.

FIG. 2 shows a schematic overview of components of a seat 10 with a headrest 20 in a first cross-sectional view, wherein the first cross-sectional view represents a plane which is oriented in the direction of an x axis and in the direction of a z axis of a system of coordinates of the locomotive means. The first cross-sectional view shows an upper part of a carrier system 30 of a backrest 50 of the seat 10 that has two carrier rods 35 running parallel. In an upper portion of the carrier system 30, in which the two carrier rods 35 running parallel are brought together in a bracket-shaped manner (not illustrated in this view), a rear wall 70 of the backrest 50 is connected in a form-fitting manner to the bracket-shaped portion at the upper end of the carrier system 30 by means of a latching connection. Furthermore, a carrier element 40 is arranged on the carrier system 30, the carrier element 40 being connected to the respective carrier rods 35 in an integrally bonded manner in the region of respective mounting portions 42 of the carrier element 40 by means of respective welded joints. A threaded rod 92 of a helical transmission is likewise connected in an integrally bonded manner to the carrier element 40 by means of a welded joint. An electric motor 90 arranged by means of a fastening element 94 in a fixed position within a headrest box 25 of the headrest 20 is in engagement with the threaded rod 92 in such a manner that a rotational movement of the electric motor 92 is converted into a relative displacement movement of the headrest box 25 with respect to the carrier element 40 in the direction of the z axis. In addition, the headrest 20 has a crash activity module 110 which is configured, in the event of an accident of the locomotive means, to move a release unit 100, which is displaceable in the direction of the x axis, of the headrest 20 in the direction of the back of a head of a user of the locomotive means.

Figure 3:
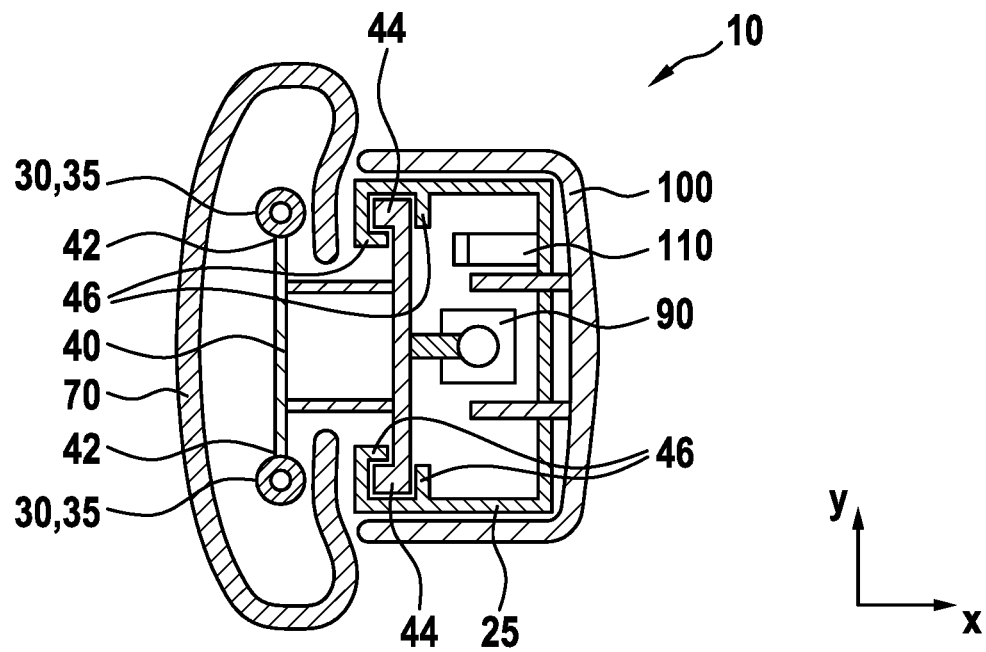
FIG. 3 shows a schematic overview of components of the seat with a headrest in a second cross-sectional view.

FIG. 3 shows a schematic overview of components of a seat 10 with a headrest 20 in a second cross-sectional view, wherein the second cross-sectional view represents a plane which is oriented in the direction of the x axis and in the direction of the y axis of the system of coordinates of the locomotive means. The second cross-sectional view represents a cross-sectional plane of the same embodiment of the seat 10 that differs from the first cross-sectional plane described in FIG. 2, and therefore essentially only the differences between FIG. 2 and FIG. 3 will be described here. In comparison to the first cross-sectional view, in the second cross-sectional view the two carrier rods 35 of the carrier system 30 can be seen which are each connected in an integrally bonded manner to one of the two mounting portions 42 of the carrier element 40 by means of the above-described welded joint. Furthermore, an exemplary shaping of the rear wall 70 can be gathered from the second cross-sectional view, the rear wall being designed here in such a manner that it encloses the rear side of the backrest 50, the lateral regions of the backrest 50 and part of the front surface of the backrest 50 of the seat 10. It is thereby ensured that no fastening and displacement components of the headrest 20 are visible toward the interior of the locomotive means. Furthermore, the second cross-sectional view shows the two guide rails 44 of the carrier element 40 and the two corresponding receiving devices 46 of the headrest box 25 engaging in one another. The second cross-sectional view furthermore shows a rear opening (i.e. facing the carrier system) in the headrest box 25 in the region of the carrier element 40.

Figure 4:
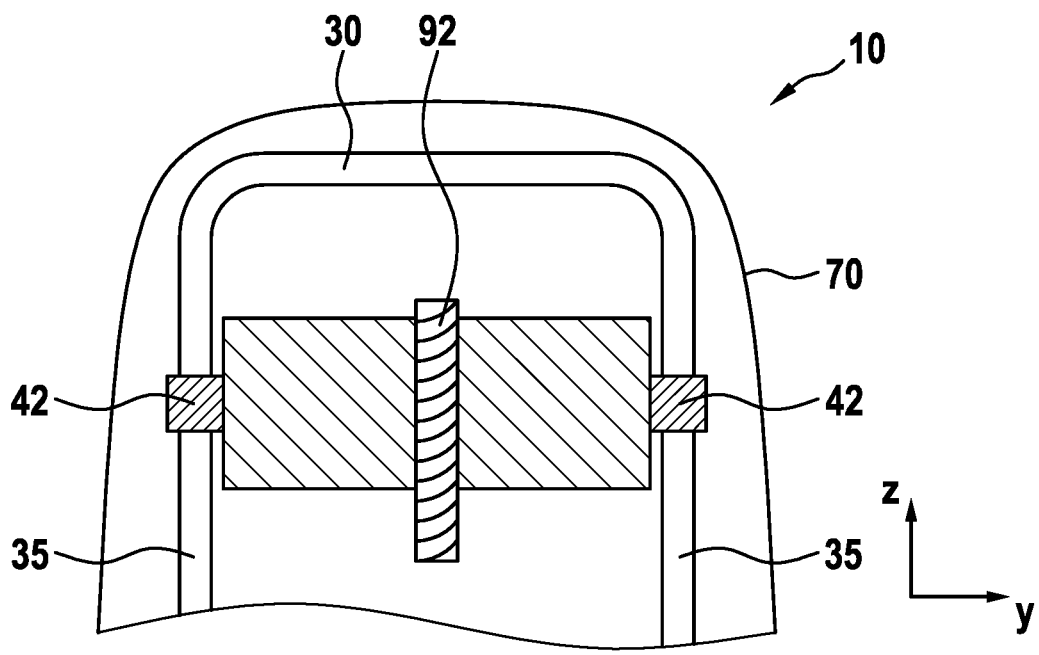
FIG. 4 shows a schematic overview of components of the seat with a headrest in a third cross-sectional view.

FIG. 4 shows a schematic overview of components of a seat 10 with a headrest 20 in a third cross-sectional view, wherein the third cross-sectional view represents a plane which is oriented in the direction of the y axis and in the direction of the z axis of the system of coordinates of the locomotive means. The third cross-sectional view represents a cross-sectional plane of the same embodiment of the seat 10 that differs from the first and second cross-sectional planes described in FIG. 2 and FIG. 3, and therefore essentially only the differences between FIG. 2, FIG. 3 and FIG. 4 will be described here. The third cross-sectional plane shows the bracket-shaped profile of the carrier system 30 at the upper end of the carrier system 30. Furthermore, the two mounting portions 42 of the carrier element 35 can be seen which, as described above, are connected to the carrier rods 35 of the carrier system 30 in an integrally bonded manner by means of a welded joint.

LIST OF REFERENCE SIGNS

10 Seat
20 Headrest
25 Headrest box
30 Carrier system
35 Carrier rod
40 Carrier element
42 Mounting portion
44 Guide rail
50 Backrest
60 Structure
70 Rear wall
80 Locomotive means
90 Electric motor
92 Threaded rod
94 Fastening element
100 Release unit
110 Crash activity module

What is claimed is:

1. A seat with a headrest for a vehicle, comprising:
a carrier system of a backrest of the seat, the carrier system comprising:
two carrier rods that run parallel and form a common bracket at an upper end of the backrest;
a carrier element comprising a mounting portion and a guide device;
a headrest box of the headrest;
an actuator disposed in a fixed position relative to the headrest box; and
a transmission, wherein
the transmission is connected in a fixed position to the carrier element within the headrest box,
the actuator is in engagement with the transmission and is configured to move the headrest box relative to both the carrier element and the transmission in a displacement direction,
the mounting portion of the carrier element is arranged in a fixed position on the carrier system in a region of the headrest,
the headrest box is arranged displaceably on the guide device, and
the headrest box is lockable with respect to the guide device in the displacement direction.

2. The seat with a headrest according to claim 1, wherein the headrest is manually and/or electrically displaceable with respect to the vehicle in a direction of at least one of:
(i) a transverse axis (y axis) of the vehicle, or
(ii) a longitudinal axis (x axis) of the vehicle, or
(iii) a vertical axis (z axis) of the vehicle.

3. The seat with a headrest according to claim 2, wherein the headrest is a crash-active headrest which has a release unit which is automatically displaceable in the direction of the x axis with respect to the headrest.

4. The seat with a headrest according to claim 2, wherein the carrier system is bent in a negative direction of the x-axis in a portion lying below the headrest, such that an expanded arrangement space and/or displacement space is available for the headrest.

5. The seat with a headrest according to claim 1, wherein the carrier system is connected in a form-fitting, force-fitting and/or integrally bonded manner to a structure of the seat or is an integral part of the structure.

6. The seat with a headrest according to claim 1, further comprising:
a rear wall of the seat which, with respect to the carrier system, lies opposite the headrest box, wherein at least one of:
(i) an upper end of the rear wall extends at least as far as an upper end of the carrier system,
(ii) the upper end of the rear wall is connected in a fixed position to the carrier system in the region of the upper end of the carrier system,
(iii) the rear wall covers the carrier system toward the interior of the vehicle, or
(iv) the rear wall substantially covers a side of the headrest facing the carrier system and/or a lateral part of the headrest.

7. The seat with a headrest according to claim 1, wherein the guide device comprises two guide rails which are each arranged on the left and the right side of the transmission in the direction of the y axis and are configured in particular to absorb the forces, which act on the headrest box, in the direction of the x axis and the y axis.

8. The seat with a headrest according to claim 1, wherein the carrier element is designed such that the guide device is configured for guiding a movement oriented substantially parallel to a direction of longitudinal extent of the carrier system of the seat.

9. A vehicle comprising:
a seat; and
a headrest according to claim 1, wherein the seat includes the headrest.

* * * * *